No. 854,454.　　　　　　　　　　　　　　　　　PATENTED MAY 21, 1907.
C. E. BOWER.
BALING PRESS.
APPLICATION FILED APR. 3, 1906.
2 SHEETS—SHEET 2.
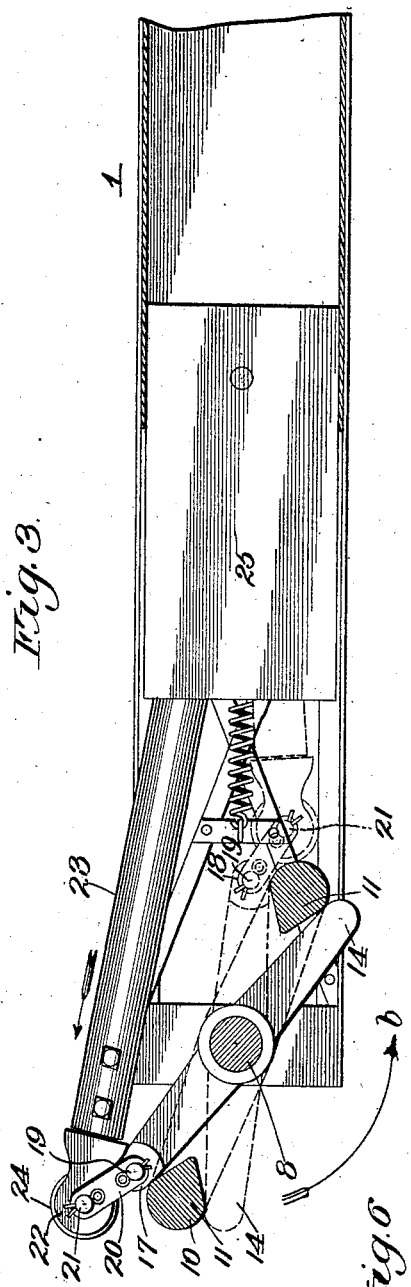
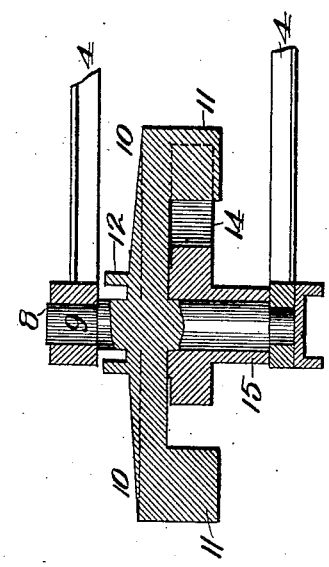
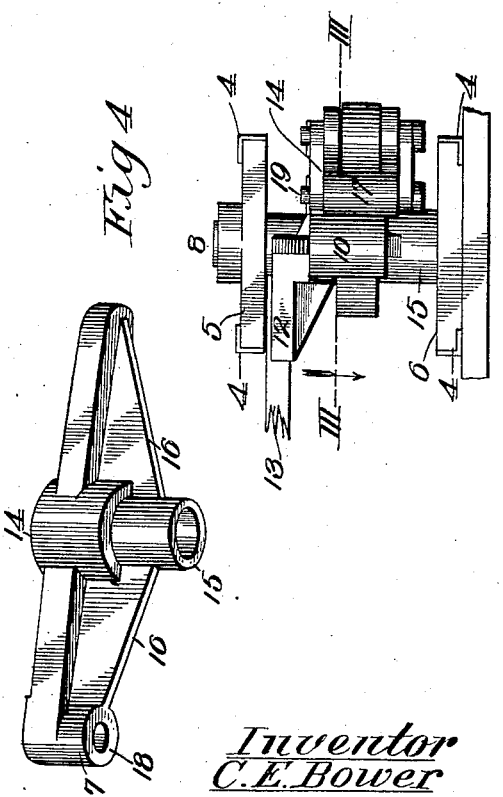
Witnesses
Frank R. Glow
H. C. Rodgers
Inventor
C. E. Bower
By George W. Thorpe
Atty.

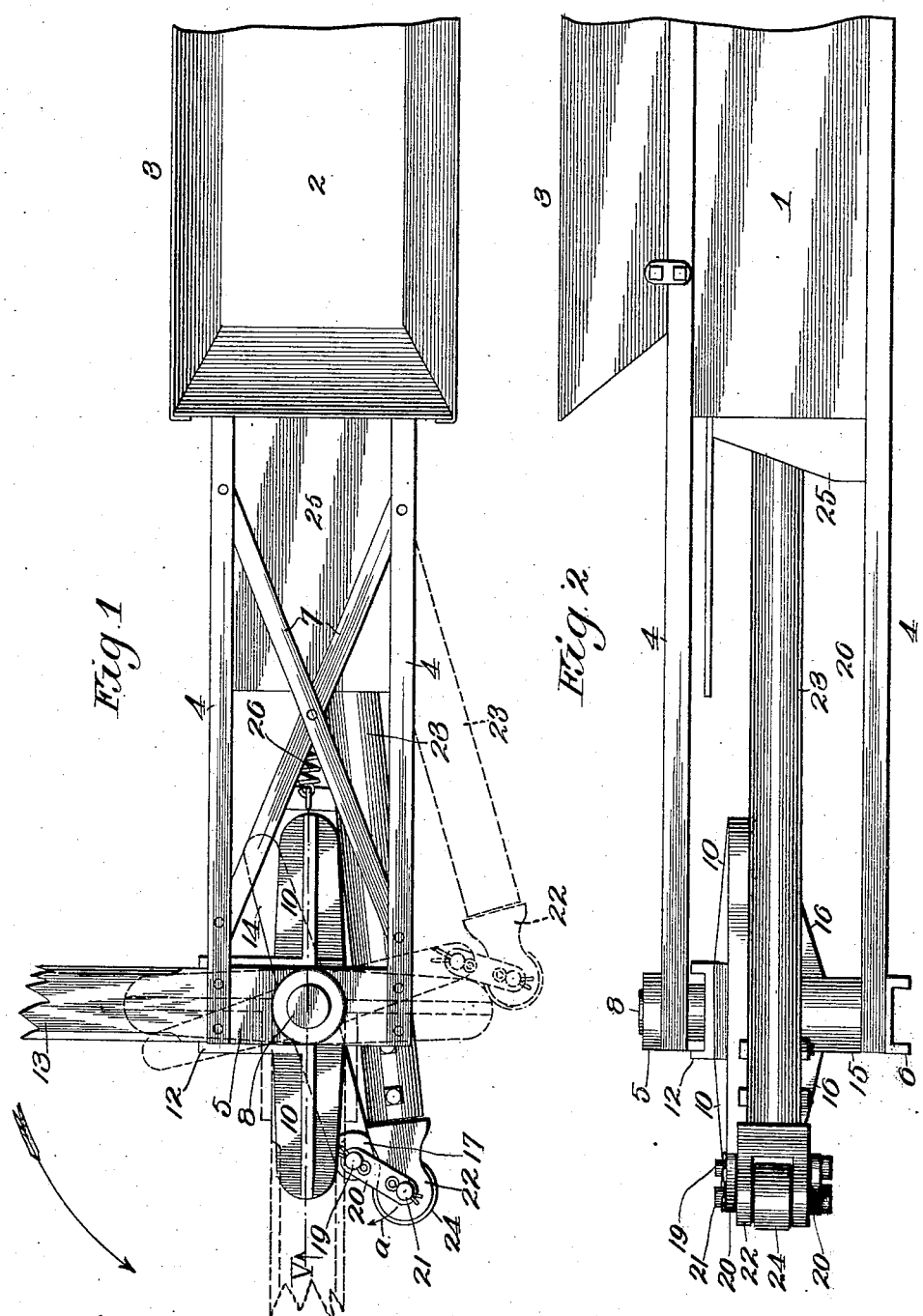

UNITED STATES PATENT OFFICE.

CLARENCE E. BOWER, OF DENVER, COLORADO.

BALING-PRESS.

No. 854,454.  Specification of Letters Patent.  Patented May 21, 1907.

Application filed April 3, 1906. Serial No. 309,584.

*To all whom it may concern:*

Be it known that I, CLARENCE E. BOWER, a citizen of the United States, residing at Denver, in the county of Denver and State of Colorado, have invented certain new and useful Improvements in Baling-Presses, of which the following is a specification.

My invention relates to baling presses and more especially to that class of the half-cycle type in which a reversible sweep is connected to impart forward movement to the plunger and to effect the automatic release of such plunger to permit it to be returned to position to make its next power stroke, and my object is to produce a baling press of this character having a comparatively long power stroke, and embodying features of construction whereby any tendency of the plunger to stick in the baling case is overcome.

Other objects of the invention will hereinafter appear and it consists in certain novel and peculiar features of construction and organization as hereinafter described and claimed, and in order that it may be fully understood reference is to be had to the accompanying drawings, in which—

Figure 1, is a top plan view of a baling press embodying my invention. Fig. 2, is a side view of the same. Fig. 3, is a horizontal section of the press on the line III—III of Fig. 4. Fig. 4, is a front view of the press as shown in Fig. 1. Fig. 5 is a vertical section taken on the dotted line V of Fig. 1. Fig. 6, is a detail perspective view of a rock-lever forming part of the machine.

In the said drawings, 1 indicates the baling case, 2 the feed opening, and 3 the feed-opening hopper of a baling press.

4 indicates corner irons—angle irons by preference,—extending forward from the press and connected at their front ends by top and bottom cross bars 5 and 6 respectively. The forwardly projecting frame constituted by these angle irons may be cased in or not as desired, the drawings simply showing the angle irons braced from lateral movement as at 7, one set of the braces not appearing.

8 indicates the power shaft having its ends 9 journaled in cross bars 5 and 6, and provided with a trip lever, comprising the oppositely projecting arms 10, having depending abutments 11, at their outer ends. The power shaft is furthermore provided with a channeled arm 12, disposed at right angles to the trip lever and above the same and fitted in and bolted to said channeled arm 12 is a sweep or horse lever 13.

14 indicates a lever pivoted upon the power shaft below the trip lever and in the plane of abutments 11 of the latter and of such length that its independent movement will be limited by said abutments to less than one hundred and eighty degrees. In order that this lever shall maintain its proper relation to the trip lever its hub portion 15 is extended so as to rest upon the cross bar 6, the lever being preferably cast with strengthening ribs 16 projecting from opposite sides of the extended hub portion, and at one end the lever is provided with a boss 17, provided with a vertical opening 18 to receive a pivot bolt 19, said pivot bolt being connected by links 20 above and below the latter to a pivot bolt 21, extending vertically through a casting 22, mounted on the end of the plunger beam 23, the bolt 21 forming a journal for an anti-friction roller 24 which is adapted at times to engage the abutments of the trip lever. At the front end of the plunger beam is secured in the usual or any preferred manner, a reciprocatory plunger 25 for operation in the baling case in a wellknown manner, and said plunger is connected by a retractile spring 26 to a fixed portion of the framework, which spring is for the purpose of effecting the recoil of the plunger in the usual manner.

In the practical operation of this machine, the draft animal, not shown, is hitched to the sweep and driven in the direction indicated by the feathered arrow Fig. 1, when the parts are disposed as shown in said figure, the baling chamber having of course received a charge of material to be baled. As the sweep is moved in the direction indicated, the abutments of the trip lever by pressure in opposite directions on the pivoted lever 14 cause the latter to turn in the same direction and therefore compel the plunger beam to move the plunger forward. As this action takes place the links 20 move relatively in the opposite direction, as indicated by the arrow *a* Fig. 1, so that the roller 24 of the plunger beam comes into engagement with the contiguous end of the trip lever when the latter has made about half its stroke, as indicated in dotted lines Fig. 1, at which time and until the completion of the stroke, the links are depended upon to hold said roller in the path of movement of the trip lever, as the tendency of the former during the intermediate portion of its movement is to swing outward beyond the path of the trip lever, this tendency of course being defeated because it is linked to the power shaft by the lever 14 and links.

Shortly after the trip lever has passed the half-way point in its travel, it imposes a direct endwise pressure upon the plunger beam as shown clearly in dotted lines Fig. 3. Eventually, that is, shortly before the trip lever has traveled a full half circle, the pivotal point of the plunger beam with the plunger, and the axis of its roller and of the engaged abutment are brought into longitudinal alinement, the continued movement causing the lever to break such alinement by drawing the roller inward of the vertical plane of said abutment and the pivotal point of the plunger beam in order that the retractive tendency of the spring 26 may effect the withdrawal action of the plunger. In this action the lever 14 and the plunger move from the position shown in dotted to the position shown in full lines Fig. 3, and shortly after this recoil takes place the sweep attains the position shown by the head of the arrow b, Fig. 3, though it will be understood that the parts may be so arranged that the movement of the sweep may be increased or diminished if desired. In this connection it will be noticed by reference to the dotted position of the parts in Fig. 3, that if the plunger should stick so firmly in the baling case that the spring could not withdraw it, that the continued movement of the trip lever would positively effect such release because it would exert a direct pull upon the plunger through the medium of the lever 14, links 20 and the plunger beam 23.

Following each recoil of the plunger the draft animal is turned so as to travel back to the point from which he started, and in such movement the trip lever is turned in the opposite direction to that described, and effects the next power stroke of the plunger, the opposite end of the trip lever in this reverse movement coming into direct engagement with the anti-friction roller of the plunger beam. It will thus be seen that the ends of the trip lever alternately apply direct pressure on said roller.

From the above description it will be apparent that I have produced a baling press embodying the features of advantage enumerated as desirable in the statement of invention, and I wish it to be understood that I do not desire to be limited to the exact details of construction shown and described for obvious modifications may occur to a person skilled in the art.

Having thus described the invention what I claim as new and desire to secure by Letters Patent is:—

1. In a baling press, a power shaft having a pair of oppositely projecting trip arms having vertical abutments, a rock-lever journaled on said power shaft in the horizontal plane of the abutments and in a vertical plane which intersects the vertical plane of the trip arms, a plunger beam, and a link pivotally connecting the plunger beam with one end of the rock-lever so that the rear end of said beam shall just prior to the latter part of the compression stroke be directly engaged by one or the other of the abutments.

2. In a baling press, a power shaft having a pair of oppositely projecting trip arms having vertical abutments, a rock-lever journaled on said power shaft in the horizontal plane of the abutments and in a vertical plane which intersects the vertical plane of the trip arms, a plunger beam in the horizontal plane of the trip arm abutments, a roller journaled at the end of said beam, a link pivotally connecting the rock-lever with the beam, and means for operating the power shaft and causing the latter to swing said link in a relatively opposite direction to that of the trip lever until the contiguous abutment of the latter is pressing against the roller of the plunger beam.

3. A baling press, comprising a suitable frame, a vertical power shaft journaled therein and provided with opposite projecting trip arms having depending abutments, a sweep rigid with the power shaft, a lever pivoted on the power shaft between the abutments of the trip arms and extending at an angle to the latter and occupying the path of motion of said abutments, a reciprocatory plunger in the baling chamber of the framework, a spring to withdraw the same, a plunger beam pivoted to the plunger, and links pivotally connecting the plunger beam with said lever.

In testimony whereof I affix my signature, in the presence of two witnesses.

CLARENCE E. BOWER.

Witnesses:
H. C. RODGERS,
G. Y. THORPE